G. JOSLIN.
Globe.
No. 224,292.   Patented Feb. 10, 1880.
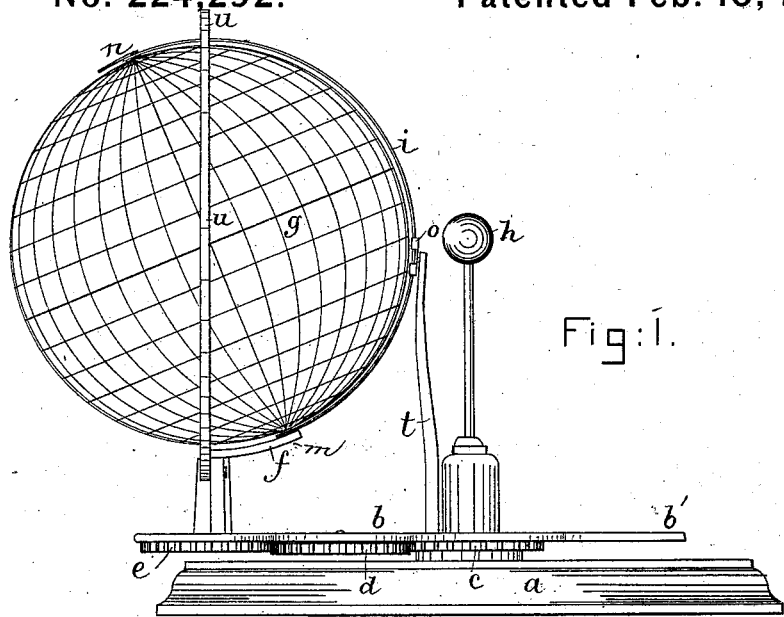
Fig:1.
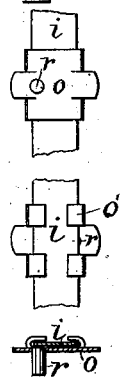
Fig:4.
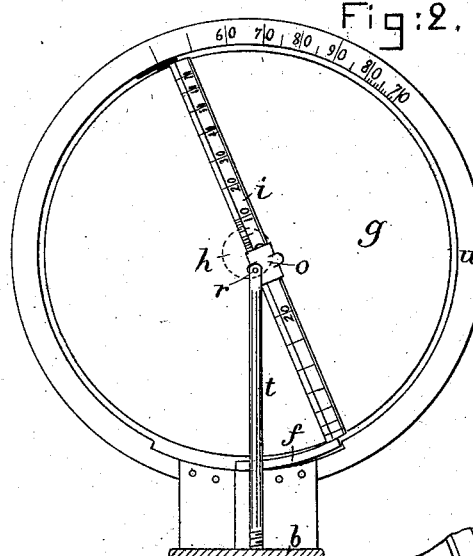
Fig:2.
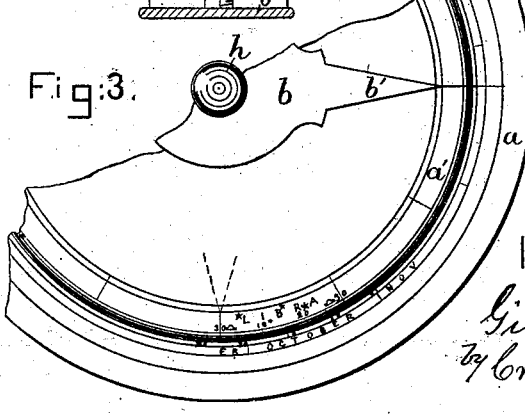
Fig:3.
Witnesses.
Jos. P. Livermore
L. F. Connor
Inventor
Gilman Joslin
by Crosby & Gregory
Attys

UNITED STATES PATENT OFFICE.

GILMAN JOSLIN, OF BOSTON, MASSACHUSETTS.

GLOBE.

SPECIFICATION forming part of Letters Patent No. 224,292, dated February 10, 1880.

Application filed July 10, 1879.

*To all whom it may concern:*

Be it known that I, GILMAN JOSLIN, of Boston, county of Suffolk, State of Massachusetts, have invented an Improvement in Globes, of which the following description, in connection with the accompanying drawings, is a specification.

My invention relates to globes, and is especially applicable to the well-known "Joslin" globe, which automatically indicates the position of the earth's axis with relation to its orbit at the different seasons of the year, and illustrates the effect thereof on the length of the day at different places and seasons, and shows the position of the sun among the constellations and the difference in time between places in different longitudes, the variations between siderial and mean time, and various terrestrial and astronomical phenomena.

My present improvement consists in the combination, with such a globe, provided with mechanism to revolve it about a ball which represents the sun, of a meridian-strip, preferably of metal, attached at the poles and passing around the globe, one edge of said strip being in a plane passing through the axis of the globe, to thereby represent a meridian, and a holding device or meridian-guide to always retain the edge of the said meridian-strip in the plane passing through the point which represents the sun.

This holding device or guide is herein shown as a piece of metal bent around the meridian to form a guide, through which the said meridian can easily slide, the upper edge of said guide being on a level with the point representing the sun, and indicating on a scale of degrees of latitude upon the meridian the distance of the sun north or south of the equator at the different times of the year. This guide is attached to a standard upon the frame, upon which the globe is held, and with which it revolves around the sun-point, the guide thus always retaining its position in line between the center of the globe and the sun-point.

Figure 1 represents a side view of a globe provided with my improvement. Fig. 2 is an elevation thereof in a different position; Fig. 3, a plan view of a portion of the frame-work, and Fig. 4 an enlarged detail, showing the meridian-guide.

The bed-plate $a$, provided with an engraved ring, $a'$, to indicate the months, days, signs of the zodiac, &c., the frame $b$, with pointer $b'$, the gears $c\ d\ e$, the latter connected by a shaft with the arm $f$, carrying the globe $g$, with its axis inclined at the angle twenty three and one-half degrees to the plane of the bed-plate $a$, and the sun-ball $h$ are and may be all as in the well-known Joslin globe.

The meridian $i$, formed of a strip of suitable material, here shown as a brass strip, is joined at the points $m\ n$, representing the poles, to the axis of the globe, so as to allow the globe to rotate independently of it. This strip or meridian is graduated, as partially shown in Fig. 2, to indicate degrees of latitude, and opposite the sun-ball $h$ passes through the guide $o$, shown as a piece of thin sheet metal, bent so as to embrace the meridian $i$ and allow it to slide freely through the said guide, which is pivoted at $r$ to the standard $t$, or to other suitable support, as the sun-ball $h$ or rod supporting it, to permit it to oscillate to conform to the varying inclination of the meridian. This guide is placed with its upper edge at just the height of the center of the globe and sun-ball $h$, so that it indicates the declination of the sun.

In Fig. 1 the globe is represented as in the winter solstice, the guide $o$ being twenty-three and one-half degrees south on the meridian $i$. In Fig. 2 the sun is opposite the equator, the guide at $o$, and the globe consequently at one of the equinoxes.

As the usual brass hoop or day-circle $u$ shows the division between the half of the globe illumined by the sun and that not illumined, or the day and the night portions, and is situated above the points at which the sun is represented as rising or setting, so the meridian $i$, being at right angles to the day-circle, is above the points most directly shone upon by the sun, or at which the time is mid-day.

I claim—

The combination of an independently-revolving globe, a meridian-strip attached at its poles, and an oscillating guide for such strip, arranged to indicate the declination of the sun, all substantially as shown and described.

In testimony whereof I have signed my name to this specification in the presence of two subscribing witnesses.

GILMAN JOSLIN.

Witnesses:
G. W. GREGORY,
N. E. WHITNEY.